United States Patent [19]

Botsolas et al.

[11] 4,025,680
[45] May 24, 1977

[54] CURVABLE FIBROUS THERMAL INSULATION

[75] Inventors: Christos John Botsolas, Rumson; Ronald Kostecki, Neshanic Station, both of N.J.

[73] Assignee: Johns-Manville Corporation, Denver, Colo.

[22] Filed: Mar. 5, 1976

[21] Appl. No.: 664,116

[52] U.S. Cl. .................................. 428/113; 428/36; 428/105; 428/112; 428/114; 428/109; 428/218; 428/297; 428/302; 428/432; 428/426; 138/149

[51] Int. Cl.[2] ...................... B32B 5/12; F16L 9/14

[58] Field of Search .......... 428/105, 113, 218, 432, 428/109, 293, 294, 297, 302, 112, 114, 36, 65, 426; 138/149, DIG. 2; 156/160, 215, 297, 218, 512

[56] References Cited

UNITED STATES PATENTS

| | | | |
|---|---|---|---|
| 347,631 | 8/1886 | Merriam | 138/149 |
| 2,332,233 | 10/1943 | Katz | 428/294 |
| 2,949,953 | 8/1960 | DiMaio | 156/160 |
| 3,012,923 | 12/1961 | Slayter | 428/538 |
| 3,620,258 | 4/1969 | Graham | 138/149 |
| 3,713,959 | 1/1973 | Rottmayer | 428/113 |
| 3,832,815 | 9/1974 | Balaz | 428/920 |
| 3,886,024 | 5/1975 | Chase | 156/294 |

*Primary Examiner*—Ellis Robinson
*Attorney, Agent, or Firm*—Robert M. Krone; Joseph J. Kelly; James W. McClain

[57] ABSTRACT

A thermal insulation structure of fibrous material is described. The insulation comprises alternating and abutting parallel strips of fibrous material wherein the fiber orientations in alternate strips are at right angles to each other. This structure preserves the insulating properties of the fibrous material while permitting it to be readily curved around a pipe without creating stresses in the material which would cause it to tend to straighten out. The fibrous material may be glass fiber, mineral wool or the like, preferably glass fiber. The density of the individual insulating batt strips may be as low as 0.5 pcf, but is preferably at least 1.5 pcf. Both pipes and curved vessels may be advantageously insulated by this invention.

8 Claims, 6 Drawing Figures

PRIOR ART

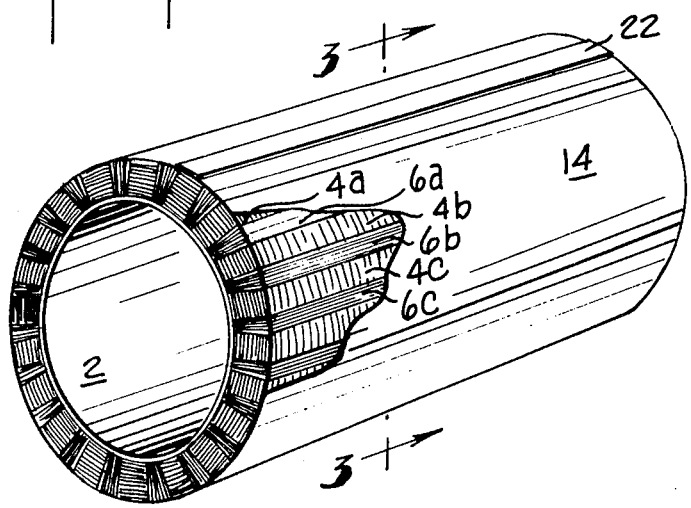
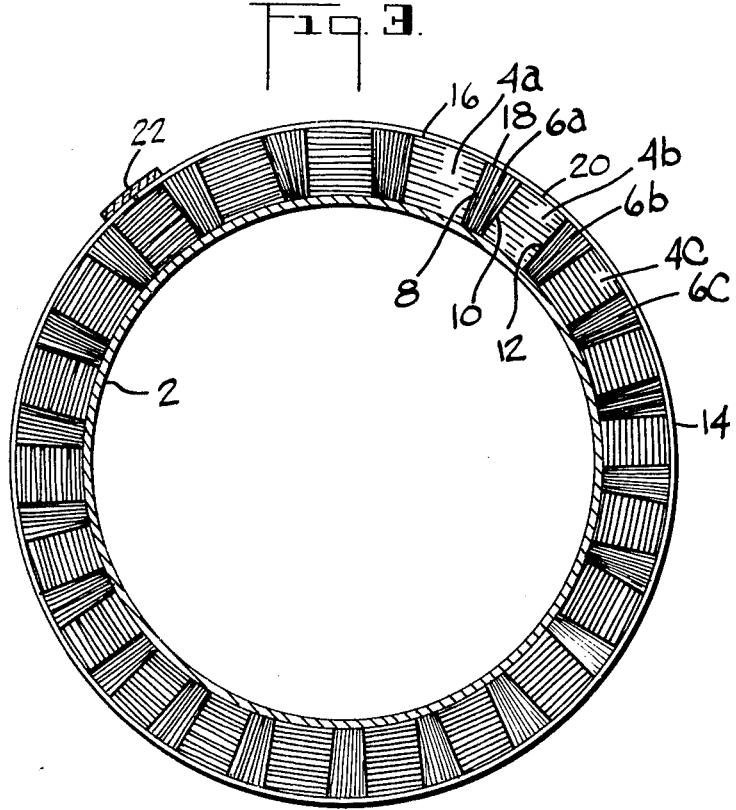

CURVABLE FIBROUS THERMAL INSULATION

BACKGROUND OF THE INVENTION

The invention herein relates to fibrous thermal insulations. More particularly, it relates to such insulations which can be manufactured in flat or board form and then bent or curved to form insulation jackets around pipes, vessels and similar curved structures.

Fibrous thermal insulations, particularly those using glass fibers and mineral wool fibers, have been commonly used for pipe insulation and the like for a number of years. Such insulation in a variety of configurations is generally represented by FIGS. 1A through 1C. FIG. 1A shows fibrous insulation wherein the orientation of the fibers is circumferential. Where the fiber density is low (less than 1.5 pounds per cubic foot ("pcf")), fibrous batts having horizontal fiber orientation can be curved to conform to the circumferential pattern shown in FIG. 1A. There is, however, a decided tendency of such materials to resile to their original flat configuration, and they must be securely held closed around the pipes to prevent their opening out and pulling away from the pipes. At higher densities, (1.5 pcf or higher) the batts or boards of fiber are generally too rigid to be curved after formation, particularly to conform to the outer surface of small diameter pipe. In such cases the fibers when unbonded are molded to the circumferential shape and then bonded in that shape by being coated with a resin binder which is subsequently cured to form a rigid curved structure. Alternatively, fibers with uncured binder can be bent to the desired curvature and then bonded by curing the binder. Typical of such molded fiber glass materials are those sold under the trademark FLAME-SAFE by Johns-Manville Corporation and which have fiber densities on the order of 3.5 to 4 pcf.

It has also been known to build up thick sections of circumferentially oriented fibrous insulations by forming spirals of very thin layers as shown in FIG. 1C, or by using concentric circumferential shells as shown in U.S. Pat. No. 3,886,024.

Thus, with higher density materials it has always been necessary to take elaborate steps to form curved pipe insulation. In addition, the molded insulations must be molded to individual pipe sizes and are thus not individually adaptable to different pipes sizes, but rather a large inventory of various premolded sizes must be maintained by the user.

In an alternative approach to forming curved fibrous pipe insulation, fibers have been oriented radially as shown in U.S. Pat. Nos. 2,949,953 and 3,012,923. Single layers have been used, or windings of multiple layers. A typical configuration is shown in FIG. 1B. Such a configuration allows for a great deal of flexibility and permits the insulation to be bent around relatively small diameter pipes. However, the radial fiber orientation has low thermal resistance. Thus, the radial material, while gaining significant flexibility over the circumferential material, provides significantly less thermal insulation.

OBJECTS OF THE INVENTION

It is an object of this invention to provide a fibrous thermal insulation which is readily flexible over a wide range of fiber densities, which provides a high degree of thermal insulation efficiency insulation, and which may be readily curved to conform to a wide variety of diameters of pipes and vessels.

BRIEF SUMMARY OF THE INVENTION

The invention herein comprises a fibrous thermal insulation comprising a plurality of abutting parallel strips of fiber with the fiber orientation in the strips alternating at right angles in adjacent strips. The strips are adhered to a backing sheet of flexible material. In a preferred embodiment the density of the fibrous material is at least 1.5 pounds per cubic foot.

The invention thus provides two significant effects not heretofore available simultaneously. First, it preserves most of the insulation value of the fibrous material, for the major portion of the fiber remains oriented transverse to the radial flow of heat. Second, it provides a flexible insulating material which does not resist bending and which has little tendency to resile to a straightened or flat configuration once it has been bent.

BRIEF DESCRIPTION OF THE DRAWINGS

FIG. 2 is a perspective view of a section of thermal insulation of the present invention.

FIG. 3 is a cross-sectional view taken through the insulation of FIG. 2 on the plane designated 3—3.

DETAILED DESCRIPTION AND PREFERRED EMBODIMENTS

Figure 1A:
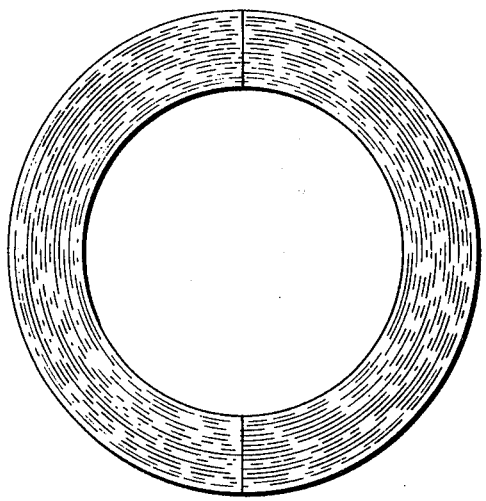
FIG. 1 shows schematically the fiber orientation in three different types of prior art insulation, labeled respectively FIGS. 1A, 1B and 1C.
Figure 1B:
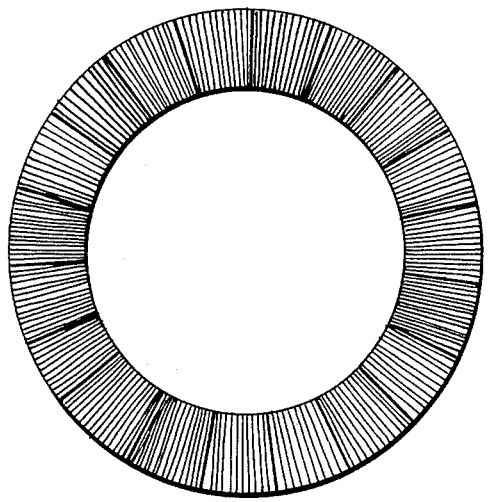

The insulation of the present invention is best understood by reference to the drawings.

The insulation comprises a plurality of parallel abutting longitudinal strips of fibrous material. In each strip the fibers have a definite predominant orientation. For the purposes of the present description, the fiber orientation will be described with reference to the pipe 2 which the insulation is intended to surround and insulate. The parallel fiber strips are oriented such the alternate strips have the fibers oriented respectively circumferentially of the pipe (as designated at 4a, 4b, 4c, etc.) and radially of the pipe (as designated at 6a, 6b, 6c, etc.). The radially disposed fibrous strips can be readily deformed into a wedge shape, as illustrated in FIG. 3, to provide the curvature desired. The circumferentially disposed strips, on the other hand, cannot be readily curved. Rather they provide a high degree of thermal resistance, thus providing the insulation function.

It is preferred that the widths of the circumferentially oriented strips be somewhat greater than the widths of the radially oriented strips (width being measured circumferentially of the pipe). This allows for flexibility of the insulation but minimizes the less thermally efficient radial portions of the insulation and maximumizes the more thermally efficient circumferential segments. Typical dimensions of the radially oriented strips are widths of 0.5 to 3 inches, preferably about 1 inch. The circumferentially oriented strips will typically have widths of 0.75 to 6 inches, preferably 1.5 to 2 inches. Both sets of strips will have the same thicknesses (measured radially of the pipe) in order to form a uniform outer surface. Thickness will depend on the economic thickness of insulation required by the heat flow of the system and the thermal conductivity properties of the fibrous material.

The adjacent strips generally designated 4 and 6 can be adhered together by use of adhesive along the abutting edges, generally indicated as 8, 10 and 12. Because of the fibrous nature of the material, however, it is preferred for handling ease to adhere the abutted strips to an overlying jacketing material 14. This material is usually and preferably a thin film or sheet of plastic, rubber, paper, metal foil, or combinations and laminations thereof. Many materials which would be satisfactory are known, such as polyvinyl chloride, fluoroelastomer resins, kraft paper, rubber sheet, aluminum foil sheet, and so forth. In general the choice of the overwrap sheet will be based on desirable properties of the sheet itself, such as providing weather protection, and economics. The various strips will be secured to the sheet 14 by use of an adhesive at surfaces 16, 18, 20, etc. Many conventional adhesives may be used and while the choice is not critical, it is preferable from a production point of view to use a hot melt adhesive for optimum production speed and absence of possible residual solvent vapors.

Figure 4:
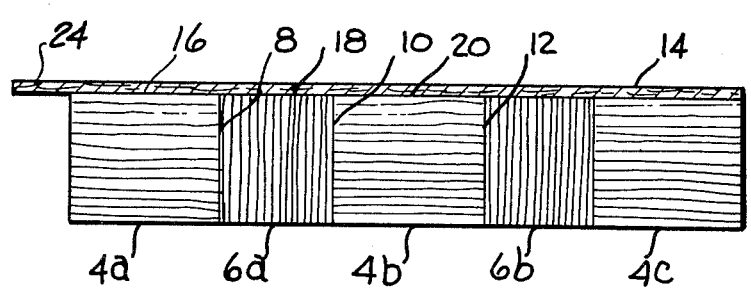
FIG. 4 is a cross-sectional view of a flat insulation board of this invention prior to its being bent to a curved configuration.

The insulation of the present invention is ordinarily produced originally in the form of a flat sheet, a portion of which is shown in cross-section in FIG. 4. For convenience in manufacturing the sheet is usually several feet wide. When it is desired to wrap the insulation around a pipe, the sheet backing 14 is split at the appropriate width and the entire insulation wrapped around the pipe such that the outboard strips of the sheet abut one another and form a seam. In order to close the outer edge of this seam a strip of tape 22 may be placed along the cut surface of the outer film 14. Alternatively, if the exact width of the formed batt of insulation conforms to the pipe to be insulated, an extension flap 24 can be provided on the film 14 to provide a sealing flap comparable to tape 22. This may be conveniently accomplished by taking a section of the flat sheet slightly wider than the circumference of the pipe, and then removing one or two fiber strips from one longitudinal edge of the sheet section to leave a flap.

The fibrous material used in the insulation of the present invention can be glass fiber, mineral wool fiber, rock wool fiber, refractory fiber or the like. Fiber sizes will be consistent with those generally used for insulating purposes. In general these are on the order of 0.5 to 5 microns. Particularly good results have been obtained with glass fibers.

Figure 1C:
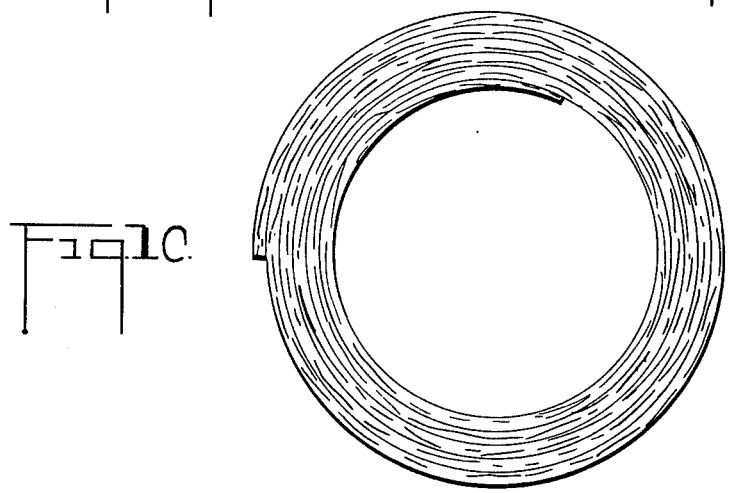

While the structure of the present insulation is such that it may be used profitably with fiber batts of densities as low as 0.5 pcf, other types of insulations of low densities are usually sufficiently flexible to be bent around pipes. With some of these, however, there can be either or both some loss of thickness and dimpling or wrinkling of the outer jacket. Thus, the advantages of the present structure may be somewhat offset by the availability of materials comparable in function in this low density area. However, when the density of the fibrous batt reaches approximately 1.5 pcf, conventional fibrous insulations become too rigid in most thicknesses to be satisfactorily bent around pipes, particularly small diameter pipes. Thus, in the past one has had to resort to the molded insulations shown in FIG. 1A; or the laminated thin layer insulation shown in FIG. 1C. The insulations of the present invention, however, are equally flexible at densities of 1.5 pcf up to 5 or more pcf. Since it is in this high density range of 1.5 pcf and above that the advantages of the present insulation are most clearly obtained, it is preferred that the fibrous insulation batts have a density of at least 1.5 pcf. It is also permissible for the two sets of strips to be of different densities, in which case preferably the circumferentially oriented strips will be of lower density of maximize insulating value.

The insulations of the present invention may be used on a wide variety of pipes and vessels, ranging in diameter from 4 inches to 25 feet or more. They will be most advantageous for small and medium diameter pipes, where the bending problems of the prior art materials are greatest.

What I claim is:

1. A flexible, bendable fibrous thermal insulation for cylindrical objects, said insulation comprising abutting, parallel strips of fibrous insulating material, wherein the fiber orientation in each strip is at right angles to the fiber orientation of each of the abutting strips; the fiber orientation of every second strip is disposed substantially circumferentially of the axis of said cylindrical object, and the fiber orientation of the remaining strips is disposed substantially radially of the axis of said cylindrical object; said insulation also having retention means comprising an overlying layer of flexible sheet jacketing material to which the abutting strips are adhered to retain the strips in abutting relationship; and said strips being of substantially uniform radial width to form a generally cylindrical outer surface of said insulation.

2. The insulation of claim 1 wherein said retention means also comprises an adhesive applied to the abutting edges of adjacent strips.

3. The insulation of claim 1 wherein said strips and layer are adhered together by a hot melt adhesive.

4. The insulation of claim 1 wherein said fibrous insulating strips each have a density of at least 0.5 pounds per cubic foot.

5. The insulation of claim 5 wherein said insulating strips each have a density of at least 1.5 pounds per cubic foot.

6. The insulation of claim 4 wherein strips oriented circumferentially of said object have a lower density than those oriented perpendicularly to said object.

7. The insulation of claim 1 wherein said fibrous material is selected from the group comprising glass fibers, refractory fiber, rock wool fiber and mineral wool fiber.

8. The insulation of claim 7 wherein said fibrous material comprises glass fiber.

* * * * *

UNITED STATES PATENT AND TRADEMARK OFFICE
CERTIFICATE OF CORRECTION

PATENT NO. : 4,025,680
DATED : May 24, 1977
INVENTOR(S) : Christos John Botsolas and Ronald Kostecki It is certified that error appears in the above-identified patent and that said Letters Patent are hereby corrected as shown below:

Column 4, line 48 (Claim 5), following insulation of "claim 5", it should read --claim 4--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks